(12) United States Patent
Hallek et al.

(10) Patent No.: US 9,702,974 B2
(45) Date of Patent: Jul. 11, 2017

(54) METHOD FOR OPERATING AN ULTRASONIC SENSOR OF A DRIVER ASSISTANCE SYSTEM IN A MOTOR VEHICLE, DRIVER ASSISTANCE SYSTEM, AND MOTOR VEHICLE

(75) Inventors: Michael Hallek, Beilstein (DE); Dietmar Gruedl, Asperg (DE); Anton Lill, Lauffen (DE); Heinrich Gotzig, Boennigheim (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 574 days.

(21) Appl. No.: 13/813,659

(22) PCT Filed: Jul. 20, 2011

(86) PCT No.: PCT/EP2011/062403
§ 371 (c)(1),
(2), (4) Date: Feb. 21, 2013

(87) PCT Pub. No.: WO2012/016828
PCT Pub. Date: Feb. 9, 2012

(65) Prior Publication Data
US 2013/0142011 A1    Jun. 6, 2013

(30) Foreign Application Priority Data
Aug. 3, 2010    (DE) .......................... 10 2010 033 210

(51) Int. Cl.
*G01S 15/00* (2006.01)
*G01S 15/93* (2006.01)
(Continued)

(52) U.S. Cl.
CPC ............ *G01S 15/931* (2013.01); *G01S 7/527* (2013.01); *G01S 7/537* (2013.01); *G01S 15/104* (2013.01);
(Continued)

(58) Field of Classification Search
USPC ............................................................ 367/87
See application file for complete search history.

(56) References Cited

U.S. PATENT DOCUMENTS

| | | | |
|---|---|---|---|
| 5,173,881 A | 12/1992 | Sindle | |
| 6,356,607 B1 * | 3/2002 | Scott ................... | H04B 1/7093 370/509 |

(Continued)

FOREIGN PATENT DOCUMENTS

| | | |
|---|---|---|
| CN | 101688914 A | 3/2010 |
| DE | 37 01 521 A1 | 8/1988 |

(Continued)

OTHER PUBLICATIONS

English Translation of EP 1231481 (also DE 10106142).*
(Continued)

*Primary Examiner* — James Hulka
(74) *Attorney, Agent, or Firm* — Osha Liang LLP

(57) ABSTRACT

The invention relates to a method for operating at least one ultrasonic sensor (4, 6) of a driver assistance system (2) in a motor vehicle (1), wherein an output sound signal ($S_A$) of the ultrasonic sensor (4, 6) is modulated in accordance with a type of modulation and by means of this modulation, a specific codeword is impressed on the output sound signal ($S_A$). For at least two mutually different functionalities (8 to 12) of the driver assistance system (2), different types of modulation are in each case used for the modulation of the output sound signal ($S_A$) and/or in each case different lengths of the codeword.

10 Claims, 2 Drawing Sheets

Figure 1:
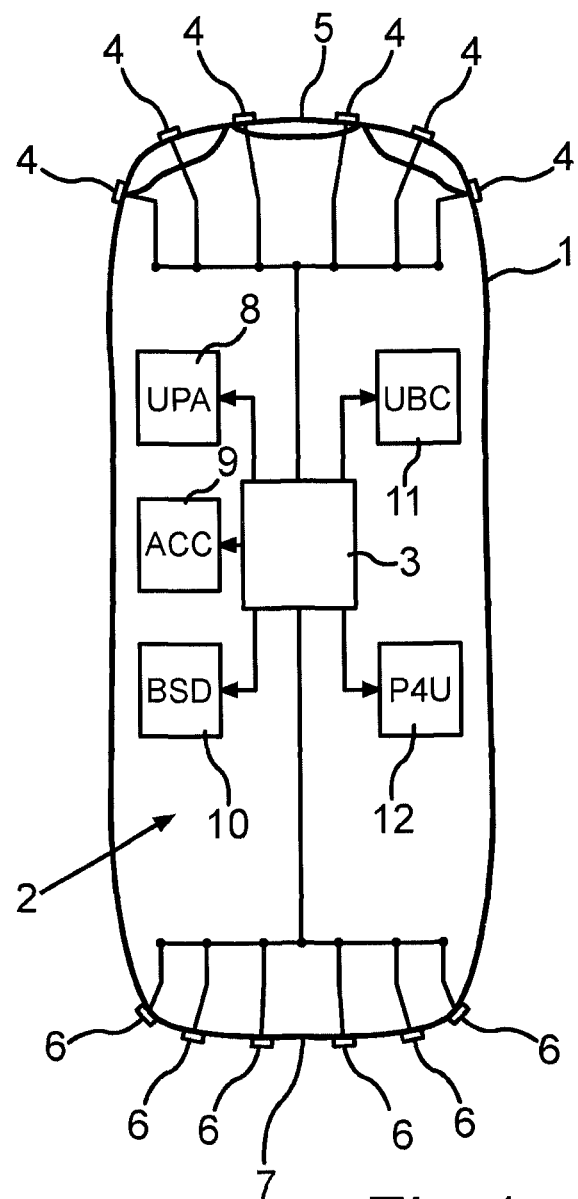

(51) Int. Cl.
*G01S 7/527* (2006.01)
*G01S 15/10* (2006.01)
*G01S 15/87* (2006.01)
*G01S 7/537* (2006.01)
*G01S 13/93* (2006.01)

(52) U.S. Cl.
CPC ............ *G01S 15/105* (2013.01); *G01S 15/87* (2013.01); *G01S 2013/9375* (2013.01); *G01S 2013/9378* (2013.01); *G01S 2013/9389* (2013.01); *G01S 2015/938* (2013.01)

(56) References Cited

U.S. PATENT DOCUMENTS

| | | | | |
|---|---|---|---|---|
| 6,470,002 | B1* | 10/2002 | Jones et al. | 370/345 |
| 6,720,876 | B1* | 4/2004 | Burgess | G01S 5/0289 340/10.1 |
| 7,009,561 | B2* | 3/2006 | Menache | A63F 13/06 340/539.13 |
| 7,138,938 | B1* | 11/2006 | Prakah-Asante et al. | 342/70 |
| 7,324,407 | B2* | 1/2008 | Diessner et al. | 367/99 |
| 7,354,400 | B2* | 4/2008 | Asafusa | G01S 7/52023 367/138 |
| 7,522,092 | B2* | 4/2009 | Okai et al. | 342/70 |
| 2006/0173305 | A1* | 8/2006 | Asafusa | G01S 7/52023 600/437 |
| 2006/0250297 | A1* | 11/2006 | Prakah-Asante et al. | 342/70 |
| 2007/0008819 | A1 | 1/2007 | Diessner et al. | |
| 2007/0200747 | A1 | 8/2007 | Okai et al. | |
| 2008/0095401 | A1* | 4/2008 | Saleh et al. | 382/103 |

FOREIGN PATENT DOCUMENTS

| | | | |
|---|---|---|---|
| DE | 101 06 142 A1 | 8/2002 | |
| EP | 1 105 749 A1 | 6/2001 | |
| EP | 1231481 A2 * | 8/2002 | ............ G01S 15/10 |
| EP | 1 801 613 A2 | 6/2007 | |
| JP | H02-165086 A | 6/1990 | |
| JP | 2005-521067 A | 7/2005 | |
| JP | 2007-232498 A | 9/2007 | |
| WO | 00/08484 A1 | 2/2000 | |
| WO | 03/083507 A1 | 10/2003 | |

OTHER PUBLICATIONS

English Translation of Written Opinion of International Search Authority for PCT/EP2011/062403.*
Office Action in corresponding Chinese Patent Application No. 201180048273.8 dated Mar. 25, 2014, with translation (22 pages).
German Search Report for 10 2010 033 210.0 dated Nov. 16, 2010, with translation (7 pages).
International Search Report issued in PCT/EP2011/062403 mailed Oct. 18, 2011 (6 pages).
Office Action in corresponding Japanese Patent Application No. 2013-522183 mailed Nov. 4, 2014, with translation (7 pages).
Office Action in corresponding Chinese Patent Application No. 201180048273.8 dated Dec. 22, 2014, with translation (18 pages).

* cited by examiner

METHOD FOR OPERATING AN ULTRASONIC SENSOR OF A DRIVER ASSISTANCE SYSTEM IN A MOTOR VEHICLE, DRIVER ASSISTANCE SYSTEM, AND MOTOR VEHICLE

The invention relates to a method for operating at least one ultrasonic sensor of a driver assistance system in a motor vehicle. An output sound signal of the ultrasonic sensor is modulated in accordance with a type of modulation and by means of this modulation, a specific codeword is impressed on the output sound signal. The invention also relates to a driver assistance system for a motor vehicle for providing at least two functionalities in the motor vehicle. Furthermore, the invention relates to a motor vehicle having such a driver assistance system.

The prior art is to modulate the output sound signal of an ultrasonic sensor in such a manner that by means of the output sound single a specific codeword—namely an identification—is transmitted. This output sound signal can then be distinguished from either noise signals or from sound signals of other sensors. This enables, for example, a simultaneous operation of a number of ultrasonic sensors. Each ultrasonic sensor then sends an output sound signal with an associated specific identification and can then recognize its own sound signal again. Thus, a number of ultrasonic sensors could therefore be operated at the same time.

A method for simultaneously operating a number of ultrasonic sensors is known, for example, from the printed document DE 101 06 142 A1. The output sound signal of a first sensor is linearly frequency-modulated, namely upward. This results in a linearly modulated wave pulse (chirp). The output sound signal of a second sensor is also linearly frequency-modulated, but downward, i.e. the frequency is reduced with time. The output sound signal of a third sensor is emitted without any frequency modulation. It is thus possible to distinguish the output sound signals of the ultrasonic sensors from one another, namely after these signals are reflected by vehicle-external objects.

From the printed document EP 1 105 749 B1, a method for operating a multiplicity of ultrasonic sensors in a motor vehicle is also known. Here, too, the output sound signals of different ultrasonic sensors are provided with their own identification and can thus be distinguished from one another. The respective identification of the output sound signals is altered with time. The received sound signals can thus be unambiguously allocated to the ultrasonic sensors if a possible noise source does not change its identification in the exact identical manner with time. The probability of an error in the allocation of the sound signals to the ultrasonic sensors is thus reduced to a minimum. The change with time of the identification can occur, for example, randomly, namely with the aid of a random function.

Coding a sound signal of an ultrasonic sensor is also known from printed document DE 37 01 521 A1.

The disadvantageous factor in the known prior art is to be considered the circumstance that the codewords modulated on have an influence on the minimum range of the ultrasonic sensor. In principle it holds true that the fewer wave pulses or wave trains are emitted by an ultrasonic sensor, the less the minimum range and the maximum range of the ultrasonic sensor. Correspondingly, it holds true that the greater the number of wave pulses, the greater the minimum and the maximum range of the ultrasonic sensor. This is because with the number of wave pulses, the total energy of the output sound signal also increases. If then in each case one bit of a codeword is transmitted with each wave pulse, the number of emitted wave pulses must be at least equal to the number of bits of the codeword. Thus, a corresponding multiplicity of wave pulses must be emitted with a correspondingly long codeword and the minimum range of the ultrasonic sensor is limited towards the bottom. There may be situations in which the ultrasonic sensor cannot detect objects which are very close to the ultrasonic sensor or in the immediate vicinity of the sensor. If, in contrast, a short codeword is chosen, the probability of an error in the allocation of the received ultrasonic signals to the individual ultrasonic sensors increases. The problem of simultaneously operating a multiplicity of ultrasonic sensors is thus solved only inadequately in the prior art.

It is the object of the invention to demonstrate a way that, in a method of the generic type mentioned initially, the output sound signal of the ultrasonic sensor can be distinguished from signals of other sensors, on the one hand, and, on the other hand, the ultrasonic sensor can be operated in a more need-oriented manner than in the prior art.

According to the invention, this object is achieved by a method having the features according to claim 1 and also by a driver assistance system having the features of claim 9 and by a motor vehicle having the features according to claim 10. Advantageous embodiments of the invention are the subject matter of the dependent claims and the description.

A method according to the invention is used for operating at least one ultrasonic sensor of a driver assistance system in a motor vehicle. An output sound signal of the ultrasonic sensor is modulated in accordance with a type of modulation and by means of this modulation, a specific codeword is impressed on the output sound signal. For at least two mutually different functionalities of the driver assistance system, different types of modulation are in each case used for the modulation of the output sound signal and/or in each case different lengths of the codeword.

It is also provided according to the invention that the driver assistance system can provide at least two different functionalities in the motor vehicle and for these at least two functionalities, a codeword having in each case a different length is impressed on the output sound signal and/or the output sound signal is in each case modulated in different ways. The invention makes use of the fact that different functionalities of a driver assistance system—e.g. the parking aid, the monitoring of the dead angle, the automatic braking function and the like—in each case require different minimum and maximum ranges of the ultrasonic sensor. Thus, different types of modulation and/or in each case different lengths of the codeword are used in each case for different minimum and maximum ranges of the ultrasonic sensor. The ultrasonic sensor can thus be operated in a more need-oriented manner than in the prior art. This is because the type of modulation and/or the length of the codeword are adapted to the currently active functionality of the driver assistance system and thus to the required minimum and maximum range of the ultrasonic sensor. For example, in the case of a functionality which requires a short minimum range, a correspondingly short codeword would be used. In contrast, in the case of a functionality which requires a large maximum range, a correspondingly great length of the codeword would be set in order to reduce the probability of an error in the allocation of the sound signal to a minimum. In the case of a great maximum range, a more rugged type of modulation can be correspondingly used than in the case of a short range.

The invention thus has the advantage that, on the one hand, a number of ultrasonic sensors can be operated at the same and the signals of different sensors can be distinguished from one another and, on the other hand, the minimum and the maximum range of the ultrasonic sensor are not negatively influenced by the impressed codeword. Depending on the choice of the codeword or of the type of modulation, it is possible to achieve a relatively short minimum range and also a large maximum range of the sensor.

The types of modulation and/or the lengths of the codeword are preferably predetermined for each functionality and are thus not random. In principle, the codeword alone can be a random codeword—this codeword is then different every time when the output sound signal is emitted. However, the codeword can also be a fixed or predetermined codeword allocated to the ultrasonic sensor.

In the present context, a codeword is understood to be an identifier with which the output sound signal of the ultrasonic sensor is provided. The codeword is preferably a sequence of bits which are transmitted together with the output sound signal emitted. A length of a codeword is here understood to be especially the number of bits of the codeword.

The output sound signal preferably comprises a predetermined sequence of wave pulses or wave trains which are emitted one after the other. To each wave pulse, at least one bit of the codeword is then preferably allocated, i.e. with each wave pulse, at least one bit is transmitted in each case. The complete sequence of wave pulses is emitted and reflected from a vehicle-external object before it is received again as reflected signal by the ultrasonic sensor. The distance from the object can then be determined by means of a delay measurement.

In one embodiment, it is provided that at least two ultrasonic sensors in each case emit one output sound signal. In each case, different codewords can then be impressed on the output sound signals of different ultrasonic sensors. In this way, it is possible to distinguish the output sound signals of different ultrasonic sensors from one another and the ultrasonic sensors can be operated simultaneously.

With at least two ultrasonic sensors, the different codewords can have the same length. Additionally or alternatively, the output sound signals of different ultrasonic sensors can be modulated in accordance with the same types of modulation. This reduces the expenditure of the modulation or of the coding of the output sound signals to a minimum and it is only necessary to provide codewords of the same length for each functionality of the driver assistance system and/or the same modulation is applied to all output sound signals.

Thus, different types of modulation and/or different lengths of the codeword are used in each case for at least two different functionalities of the driver assistance system. In the present text, a functionality is understood especially to be an application or an operating mode of the driver assistance system. In particular, different functionalities are provided in different road situations or traffic situations, respectively. The driver of the motor vehicle is thus supported by each functionality in another road situation in each case.

The at least two functionalities can comprise, for example, at least two of the following functionalities:
an adaptive cruise control (ACC),
monitoring of a blind spot area of the motor vehicle (Blind Spot Detection, BSD),
automatic braking of the motor vehicle due to an obstacle detected in an environment of the motor vehicle (Ultrasonic Brake Control, UBC),
outputting of information about a distance between the motor vehicle and a vehicle-external obstacle, especially during parking (Ultrasonic Park Assist, UPA),
automatic (autonomous) and/or semiautomatic (semiautonomous) parking or pulling out with the aid of the driver assistance system—this functionality comprises that a parking gap is surveyed by the driver assistance system and a parking track is calculated along which the motor vehicle is either steered by the driver or is automatically steered into the parking gap or pulled out of the parking gap.

It is especially these functionalities which are distinguished from one another in that in each case different ranges—namely minimum and maximum ranges—of the ultrasonic sensor are needed. If a short minimum range is needed, i.e. if objects are to be detected quite close to the motor vehicle, a codeword having a short length is preferably used, namely, for example, a codeword having 16 bits. This is the case, for example, in the case of a parking aid as a functionality of the driver assistance system in which the driver is informed about the distances between the motor vehicle and vehicle-external objects during the parking. As a rule, these vehicle-external objects are relatively close to the motor vehicle during the parking so that a correspondingly short length can also be specified for the codeword. If, in contrast, a relatively large maximum range of the ultrasonic sensor is needed, a codeword having a correspondingly greater length is preferably used, namely, for example, a codeword having 64 bits. The radiated energy is then sufficient for achieving, for example, a maximum range of 10 m. This relatively large maximum range is needed, for example, in the case of automatic braking, when vehicle-external objects are to be detected relatively early.

In one embodiment, the functionalities of the driver assistance system are thus distinguished from one another in accordance with a minimum range above which vehicle-external objects can be detected by the ultrasonic sensor and/or in accordance with a maximum range up to which the objects are detectable. In this embodiment, the type of modulation and/or the length of the codeword can be specified for the respective functionality taking into consideration the minimum range and/or the maximum range. It is especially then that the advantages of the present invention achieve their full potential; the type of modulation and/or the length of the codeword can be adapted to the respective range, namely in such a manner that the necessary range of the ultrasonic sensor is not negatively affected.

Thus, a codeword having a relatively great length and/or a rugged type of modulation can be used when a greater range is needed for the ultrasonic sensor. And conversely, a codeword having a relatively short length and/or a less rugged type of modulation can be used when a shorter range is needed for the ultrasonic sensor. For example, frequency shift keying (FSK) can be used as a less rugged type of modulation. In contrast, a digital phase modulation, especially the quadrature phase shift keying (QPSK) can be used as a rugged type of modulation.

With respect to the length of the codeword, the following lengths can be set, for example, depending on the functionality of the driver assistance system: 16 bits, 24 bits, 32 bits, 48 bits, 64 bits. This covers different ranges of the ultrasonic sensor—namely for different functionalities.

For example, the following table can be applied:

| Functionality or operating mode | Parking aid | ACC | Blind spot monitoring | Automatic braking | Automatic parking |
|---|---|---|---|---|---|
| Minimum range [m] | 0.15-0.20 | 0.20-0.30 | 0.30-0.50 | 0.40-0.60 | 0.30-0.40 |
| Maximum range [m] | 2.5 | 4 | 8 | 10 | 6 |
| Type of modulation | FSK | FSK | QPSK | QPSK | FSK |
| Length of codeword (number of bits) | 16 | 24 | 48 | 64 | 32 |

According to the invention, a driver assistance system is additionally provided for a motor vehicle, namely for providing at least two different functionalities in the motor vehicle. The driver assistance system comprises at least one ultrasonic sensor and a controller for driving the ultrasonic sensor. The controller can cause the ultrasonic sensor to emit an output sound signal, modulated in accordance with a type of modulation, with an impressed specific codeword. The controller is designed for using for at least two mutually different functionalities of the driver assistance system in each case different types of modulation for the modulation of the output sound signal and/or in each case different lengths of the codeword.

A motor vehicle according to the invention comprises a driver assistance system according to the invention.

The preferred embodiments presented with respect to the method according to the invention and their advantages correspondingly apply to the driver assistance system according to the invention and the motor vehicle according to the invention.

Other features of the invention are obtained from the claims, the figures and the description of the figures. All the features and combinations of features mentioned above in the description and the features and combinations of features mentioned subsequently in the description of the figures and/or shown in the figures alone can be used not only in the combination specified in each case but also in other combinations or by themselves.

Figure 2:
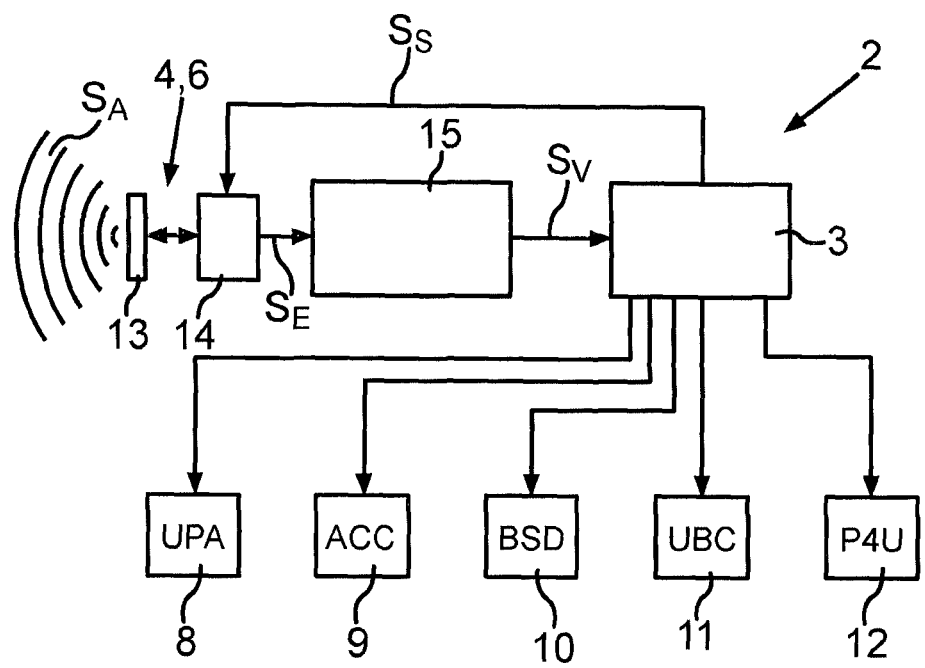
Figure 3:
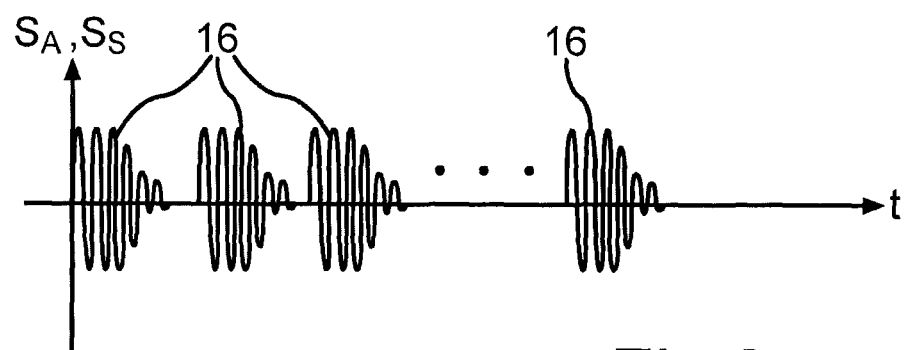

The invention will now be explained with reference to individual preferred illustrative embodiments and also with reference to the attached drawings, in which:

FIG. 1 shows a diagrammatic representation of a motor vehicle having a driver assistance system according to one embodiment of the invention, FIG. 2 shows a block diagram of the driver assistance system according to FIG. 1, only one ultrasonic sensor being shown for explaining the operation of the driver assistance system; and FIG. 3 shows an illustrative variation of an output sound signal of the ultrasonic sensor with time.

A motor vehicle 1 shown in diagrammatic and highly abstract representation in FIG. 1 can be, for example, a passenger vehicle. The motor vehicle 1 comprises a driver assistance system 2 which provides the most varied functionalities in the motor vehicle 1 by means of which a driver is supported when driving the motor vehicle 1. The driver assistance system 2 comprises a controller 3 which can comprise at least one microcontroller and/or at least one digital signal processor and/or at least one memory.

The driver assistance system 2 also comprises a multiplicity of ultrasonic sensors, namely a number of ultrasonic sensors 4 which are mounted on a front bumper 5 of the motor vehicle 1 and a number of ultrasonic sensors 6 which are mounted on a rear bumper 7. The number and the arrangement of the ultrasonic sensors 4, 6 are only illustrative in FIG. 1; both the number and the arrangement of the ultrasonic sensors 4, 6 can be different depending on the design of the driver assistance system 2. The ultrasonic sensors 4, 6 are coupled to the controller 3 and are driven by the controller 3.

The controller 3 provides the most varied functionalities, namely in dependence on measurement data of the ultrasonic sensors 4, 6. For example, the following functionalities can be provided by the driver assistance system:

adaptive cruise control (ACC),

Monitoring of the dead angle area of the motor vehicle 1 (Blind Spot Detection, BSD), Automatic braking of the motor vehicle 1 due to a detected obstacle or after detection of a situation in which a collision between the motor vehicle 1 and a vehicle-external obstacle is impending (Ultrasonic Brake Control, UBC), Outputting of information about a distance between the motor vehicle 1 and a vehicle-external obstacle, especially during parking (Ultrasonic Park Assistance, UPA), and Automatic parking and/or pulling out during which initially a parking gap is surveyed by the driver assistance system 2 (for example Park For You, P4U).

Thus, the driver assistance system 2 can provide different functionalities 8 to 12, namely the UPA, ACC, BSD, UBC, P4U.

In principle, the functionalities 8 to 12 mentioned represent different operating modes of the driver assistance system 2.

Before each functionality 8 to 12 is provided or, respectively, before each operating mode is activated, a different codeword, that is to say a specific identifier, is in each case assigned to each ultrasonic sensor 4, 6. The ultrasonic sensors 4, 6 thus receive different codewords in each case and can be operated at the same time. The individual codewords can be permanently assigned or predetermined codewords or in each case randomly selected codewords. In this manner it becomes possible to distinguish the signals of different ultrasonic sensors 4, 6 on the one hand from one another and, on the other hand, also from other vehicle-external noise sources.

FIG. 2 shows the driver assistance system 2 with a single ultrasonic sensor 4, 6. Using FIG. 2, the operation of the driver assistance system 2 will now be explained in greater detail. The ultrasonic sensor 4, 6 comprises a diaphragm 13—constructed, for example, of aluminium, and an exciter 14. The exciter 14 can contain, for example, a piezoelectric element which can be made to oscillate under the influence of an electrical alternating voltage. The piezoelectric element can also generate electrical voltage, namely due to an oscillation. The exciter 14 mechanically excites the diaphragm 13. An excited diaphragm then generates an output sound signal $S_A$.

A receiver 15 is coupled to the exciter 14. The exciter 14 outputs received signals $S_E$—in this case an electrical alternating voltage—to the receiver 15. The receiver 15 can process, namely, for example, amplify and/or filter and the like, the received signal $S_E$. The receiver 15 conveys these processed signals $S_V$ to the controller 3. The controller 3 can detect a distance between detected objects and the ultrasonic sensor 4, 6 on the basis of the signals $S_V$ and assess the functionalities 8 to 12 on the basis of these distances. The controller 3 can also drive the exciter 14, namely by outputting corresponding control signals $S_S$. Thus, the controller 3 can cause an excitation of the diaphragm 13 by correspondingly driving the exciter 14 in order to measure a distance of an object from the ultrasonic sensor 4, 6.

As already stated, a different codeword is in each case assigned to each sensor 4, 6. The codeword is impressed on the output sound signal $S_A$ and transmitted with the output sound signal $S_A$. For this purpose, the output sound signal $S_A$ is correspondingly modulated. This modulation is carried in such a manner that initially the control signal $S_S$—that is to say electrical voltage—is correspondingly modulated and the codeword is impressed on the control signal $S_S$. If then a reflected sound is received again, the received signal $S_E$ also influences the assigned codeword and the controller 3 can determine whether the received signal $S_E$ is allocated to the ultrasonic sensor 4, 6 or not.

FIG. 3 shows an illustrative variation of the output sound signal $S_A$ or of the control signal $S_S$, respectively with time t. The output sound signal $S_A$ contains a multiplicity of wave pulses or wave trains 16, respectively, which are emitted one after the other. If all wave pulses 16 are emitted, the system waits until the reflected sound arrives at the ultrasonic sensor 4, 6 again. For a single measurement, a predetermined sequence of wave pulses 16 is thus emitted. The wave pulses 16 are reflected from a vehicle-external object and the reflected wave pulses 16 are received by the ultrasonic sensor 4, 6. Correspondingly, the received signal $S_E$ then also contains a multiplicity of wave pulses 16.

With each wave pulse 16, at least one bit of the assigned codeword is transmitted. For this purpose, frequency shift keying (FSK) or else quadrature phase shift keying (QPSK) can be applied, for example, to the wave pulses 16. The most varied functionalities 8 to 12 or operating modes of the driver assistance system 2 also need the most varied ranges of the ultrasonic sensors 4, 6. Some functionalities 8 to 12 need short minimum ranges; other functionalities 8 to 12 need a relatively large maximum range. The minimum range defines the distance above which the ultrasonic sensor 4, 6 can detect objects. In contrast, the maximum range defines a distance up to which the ultrasonic sensor 4, 6 can detect objects. In principle it holds true that the greater the number of wave pulses 16, the greater the minimum and the maximum range of the ultrasonic sensor 4, 6. In principle, it is not possible to achieve a very short minimum range and a very large maximum range. If the maximum range is enlarged, the minimum range also becomes automatically enlarged. And conversely, if the minimum range is decreased, the maximum range also becomes decreased. This is attributable to the fact that with a large number of wave pulses 16, a greater energy overall is emitted than in the case of a lesser number of wave pulses 16. In order to take this dependence into consideration, different lengths of the codewords are used in each case for different functionalities 8 to 12 and thus also for different ranges needed for the ultrasonic sensors 4, 6. For the functionalities 8 to 12, two different types of modulation are also used, namely, on the one hand, FSK, and on the other hand, the more rugged QPSK.

The table following contains the respective bit lengths of the codewords allocated to the type of modulation used and the minimum and maximum ranges needed which should be achieved for the respective functionality 8 to 12.

| Functionality | UPA | ACC | BSD | UBC | P4U |
|---|---|---|---|---|---|
| Minimum range [m] | 0.15-0.20 | 0.20-0.30 | 0.30-0.50 | 0.40-0.60 | 0.30-0.40 |
| Maximum range [m] | 2.5 | 4 | 8 | 10 | 6 |
| Type of modulation | FSK | FSK | QPSK | QPSK | FSK |
| Length of codeword | 16 Bits | 24 Bits | 48 Bits | 64 Bits | 32 Bits |

In principle, codewords having the same length can be assigned to all ultrasonic sensors 4, 6 and the output sound signals $S_A$ of all ultrasonic sensors 4, 6 can be modulated in each case in accordance with the same type of modulation. However, it is also possible that different ultrasonic sensors 4, 6 contain codewords of different length and/or the output sound signals $S_A$ of different ultrasonic sensors 4, 6 are modulated in accordance with different types of modulation.

Adapting the codewords to the respective functionality 8 to 12 has the advantage that, on the one hand, very short minimum ranges of the ultrasonic sensors 4, 6 can be achieved but the ultrasonic sensors 4, 6 can be operated simultaneously and, on the other hand, with a relatively large maximum range and thus with a relatively great length of the codeword, the probability of an error in the allocation of the output sound signals $S_A$ to the respective ultrasonic sensors 4, 6 is reduced to a minimum.

The invention claimed is:

1. A method for operating at least one ultrasonic sensor of a driver assistance system in a motor vehicle, comprising:
   modulating an output sound signal of an ultrasonic sensor in accordance with a type of modulation, and via the modulation, impressing a specific codeword on the output sound signal,
   wherein, for a first driver-assistive functionality of the driver assistance system, at least one selected from a group consisting of a first modulation of the output sound signal of the ultrasonic sensor and a first length of the codeword is used;
   wherein, for a second driver-assistive functionality of the driver assistance system, different from the first driver-assistive functionality, at least one selected from a group consisting of a second modulation of the output sound signal of the ultrasonic sensor and a second length of the codeword is used;
   wherein the first and the second driver-assistive functionalities are selected from a group consisting of an assistive functionality that controls vehicle movement and an assistive functionality that provides feedback to the driver;
   wherein the first driver-assistive, functionality requires a sensing range shorter than the second driver-assistive functionality; and
   selecting, based on the shorter sensing range of the first driver assistive functionality, a first length of the codeword shorter than a second length of the codeword for the second-driver-assistive functionality with the longer sensing range, to enable sensing in the shorter and longer sensing ranges, respectively.

2. The method according to claim 1, wherein at least two ultrasonic sensors emit output sound signals, and wherein different codewords are impressed on the output sound signals of the at least two ultrasonic sensors.

3. The method according to claim 2, wherein the different codewords have the same length and/or the output sound signals of different ultrasonic sensors are modulated in accordance with the same type of modulation.

4. The method according to claim 1, wherein for at least two of the following driver-assistive functionalities of the driver assistance system different types of modulation and/or different lengths of the codeword are used:
adaptive cruise control,
monitoring of a blind spot area of the motor vehicle,
automatic braking of the motor vehicle due to a detected obstacle,
outputting of information about a distance between the motor vehicle and a vehicle-external obstacle during parking, and/or
automatic parking and/or pulling out with the aid of the driver assistance system.

5. The method according to claim 1, wherein the driver assistive functionalities of the driver assistance system are distinguished from one another in accordance with a minimum range above which vehicle-external objects are detected by the at least one ultrasonic sensor, and/or in accordance with a maximum range up to which the objects are detectable, and, taking into consideration the minimum range and/or the maximum range, the type of modulation and/or the length of the codeword is specified for the respective driver assistive functionality.

6. The method according to claim 1, wherein for at least one driver-assistive functionality of the driver assistance system, frequency shift keying is used as type of modulation.

7. The method according to claim 1, wherein for at least one driver-assistive functionality of the driver assistance system, a digital phase modulation comprising quadrature phase shift keying, is used.

8. The method according to claim 1, wherein at least two of the following lengths of the codeword are in each case used for at least one driver-assistive functionality of the driver assistance system:
16 bits,
24 bits,
32 bits,
48 bits, and
64 bits.

9. A driver assistance system for a motor vehicle for providing at least two functionalities in the motor vehicle, comprising:
at least one ultrasonic sensor; and
a controller for driving the ultrasonic sensor, which is designed for causing the ultrasonic sensor to emit an output sound signal, modulated in accordance with a type of modulation, with an impressed specific codeword,
wherein, for a first driver-assistive functionality of the driver assistance system, the controller is configured to use at least one selected from a group consisting of a first modulation of the output sound signal of the ultrasonic sensor and a first length of the codeword;
wherein, for a second driver-assistive functionality of the driver assistance system, different from the first-driver-assistive functionality, the controller is configured to use at least one selected from a group consisting of a second modulation of the output sound signal of the ultrasonic sensor and a second length of the codeword
wherein the first and the second driver-assistive functionalities are selected from a group consisting of an assistive functionality that controls vehicle movement and an assistive functionality that provides feedback to the driver;
wherein the first driver assistive functionality requires a sensing range shorter than the second driver-assistive functionality; and
wherein the controller is configured to select, based on the shorter sensing range of the first driver assistive functionality, a first length of the codeword shorter than a second length of the codeword for the second-driver-assistive functionality with the longer sensing range, to enable sensing in the shorter and longer sensing ranges, respectively.

10. A motor vehicle having a driver assistance system according to claim 9.

* * * * *